(12) United States Patent
Laso et al.

(10) Patent No.: US 9,720,164 B2
(45) Date of Patent: Aug. 1, 2017

(54) MANAGED ILLUMINATION LIGHTGUIDE

(71) Applicants: Jose Antonio Laso, Fairburn, GA (US); Adam Moore Foy, Peachtree City, GA (US); Scott David Wegner, Peachtree City, GA (US)

(72) Inventors: Jose Antonio Laso, Fairburn, GA (US); Adam Moore Foy, Peachtree City, GA (US); Scott David Wegner, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/726,205

(22) Filed: May 29, 2015

(65) Prior Publication Data

US 2015/0346424 A1    Dec. 3, 2015

Related U.S. Application Data

(60) Provisional application No. 62/005,339, filed on May 30, 2014.

(51) Int. Cl.
*F21V 8/00* (2006.01)
*F21V 5/04* (2006.01)
(Continued)

(52) U.S. Cl.
CPC ............ *G02B 6/0073* (2013.01); *F21V 3/049* (2013.01); *F21V 5/048* (2013.01); *F21V 7/0091* (2013.01);
(Continued)

(58) Field of Classification Search
CPC ........ F21V 3/049; F21V 3/0427; F21V 5/048; F21V 5/008; F21V 7/0008; F21V 7/0025;
(Continued)

(56) References Cited

U.S. PATENT DOCUMENTS 4,466,697 A * 8/1984 Daniel .................. A47G 19/16
                                                    264/1.24
4,924,357 A * 5/1990 Yamashita ............. G02B 6/001
                                                    355/67

(Continued)

FOREIGN PATENT DOCUMENTS

CN    1371018    9/2002
WO    WO 03/009012    1/2003
(Continued)

OTHER PUBLICATIONS

International Search Report for PCT/US2014/026500, mailed Aug. 7, 2014.
(Continued)

*Primary Examiner* — Hargobind S Sawhney
(74) *Attorney, Agent, or Firm* — King & Spalding LLP

(57) ABSTRACT

A lighting system can comprise an edgelit panel, for example a lightguide that may have a panel or slab shape with an edge that receives light from an array of light emitting diodes extending along the edge. The lightguide can guide the received light towards an opposing edge of the lightguide and gradually release light to provide illumination. An optic can manage light that reaches the opposing edge of the lightguide, for example via softening, spreading, concentrating, or diffusing the light. The optic can be mounted to or integrated in the opposing edge of the lightguide.

19 Claims, 13 Drawing Sheets

(51) Int. Cl.
*F21V 3/04* (2006.01)
*F21V 7/00* (2006.01)
*F21Y 115/10* (2016.01)

(52) U.S. Cl.
CPC .......... *G02B 6/005* (2013.01); *G02B 6/0015* (2013.01); *G02B 6/0033* (2013.01); *F21Y 2115/10* (2016.08); *G02B 6/0051* (2013.01); *G02B 6/0063* (2013.01)

(58) Field of Classification Search
CPC .... F21V 7/0091; F21V 7/048; F21V 2200/20; F21V 7/0016; F21V 7/05; F21V 15/01; G02B 6/0005; G02B 6/0008; G02B 6/005; G02B 6/0011; G02B 6/0033; G02B 6/0015; G02B 6/0063; G02B 6/0051; G02B 1/045; G02B 6/002; G02B 6/0025; G02B 6/0001; G02B 6/0031; F21Y 2101/02; F21Y 2103/10; F21Y 2105/10; F21K 9/61; F21K 9/64; F21S 10/005; F21S 8/02; F21S 8/026
See application file for complete search history.

(56) References Cited

U.S. PATENT DOCUMENTS

| | | | |
|---|---|---|---|
| D374,301 S | 10/1996 | Kieffman | |
| D386,804 S | 11/1997 | Engel | |
| 5,988,836 A | 11/1999 | Swarens | |
| 6,350,041 B1* | 2/2002 | Tarsa | F21K 9/00 257/E33.072 |
| 6,474,858 B1* | 11/2002 | Liao | F21S 10/002 362/101 |
| 6,488,397 B1* | 12/2002 | Masutani | F21V 7/005 362/551 |
| D477,891 S | 7/2003 | Fritze et al. | |
| 6,784,603 B2* | 8/2004 | Pelka | B82Y 10/00 313/110 |
| D496,121 S | 9/2004 | Santoro | |
| D593,246 S | 5/2009 | Fowler | |
| D595,006 S | 6/2009 | Santoro | |
| D604,000 S | 11/2009 | Fowler | |
| D608,932 S | 1/2010 | Castelli | |
| D633,247 S | 2/2011 | Kong et al. | |
| D653,376 S | 1/2012 | Kong et al. | |
| 8,128,256 B2 | 3/2012 | Kim et al. | |
| 8,128,267 B2* | 3/2012 | Sormani | F21K 9/00 362/553 |
| D664,699 S | 7/2012 | Nakahira et al. | |
| 8,232,724 B2 | 7/2012 | Mostoller et al. | |
| D665,119 S | 8/2012 | Bryant | |
| D667,983 S | 9/2012 | Pickard et al. | |
| 8,278,806 B1* | 10/2012 | Moskowitz | F21K 9/52 313/113 |
| D672,079 S | 12/2012 | Kong et al. | |
| D673,711 S | 1/2013 | Pickard et al. | |
| D675,364 S | 1/2013 | Watt | |
| D677,820 S | 3/2013 | Mayfield et al. | |
| D678,597 S | 3/2013 | Lehman et al. | |
| D681,872 S | 5/2013 | Kong et al. | |
| D685,942 S | 7/2013 | Duquette et al. | |
| 8,573,823 B2* | 11/2013 | Dau | G02B 6/0045 362/222 |
| D696,449 S | 12/2013 | Boyer et al. | |
| D698,969 S | 2/2014 | Johns et al. | |
| D698,973 S | 2/2014 | Santoro et al. | |
| D698,975 S | 2/2014 | Blessitt et al. | |
| D699,386 S | 2/2014 | Park et al. | |
| D701,988 S | 4/2014 | Clements | |
| D705,474 S | 5/2014 | Philips | |
| D705,974 S | 5/2014 | Blessitt et al. | |
| D707,873 S | 6/2014 | Boyer et al. | |
| 8,833,969 B2* | 9/2014 | Speier | F21S 8/04 362/224 |
| D714,988 S | 10/2014 | Park et al. | |
| 8,998,478 B2* | 4/2015 | McCollum | F21S 8/06 362/147 |
| D735,391 S | 7/2015 | Blessitt | |
| 9,110,209 B2* | 8/2015 | Blessitt | G02B 6/0055 |
| D739,977 S | 9/2015 | Boyer | |
| 9,127,826 B2 | 9/2015 | Boyer | |
| 2006/0273653 A1* | 12/2006 | Lewis | B62J 6/20 301/37.41 |
| 2008/0055534 A1 | 3/2008 | Kawano | |
| 2008/0192458 A1* | 8/2008 | Li | A61B 1/0653 362/84 |
| 2009/0103327 A1 | 4/2009 | Iwasaki et al. | |
| 2010/0149815 A1* | 6/2010 | Erchak | F21S 2/00 362/293 |
| 2010/0246158 A1* | 9/2010 | Van Gorkom | F21S 8/06 362/19 |
| 2010/0271841 A1 | 10/2010 | Kim | |
| 2011/0176306 A1 | 7/2011 | Kim et al. | |
| 2012/0182713 A1 | 7/2012 | Bretschneider | |
| 2013/0039050 A1* | 2/2013 | Dau | G02B 6/0045 362/218 |
| 2013/0051067 A1 | 2/2013 | Chen | |
| 2013/0194820 A1 | 8/2013 | Pickard et al. | |
| 2013/0208457 A1 | 8/2013 | Durkee et al. | |
| 2013/0208495 A1* | 8/2013 | Dau | F21V 7/0008 362/551 |
| 2013/0294053 A1 | 11/2013 | Marquardt et al. | |
| 2013/0307420 A1 | 11/2013 | Yoder et al. | |
| 2014/0036533 A1 | 2/2014 | Smith-Gillespie | |
| 2014/0198481 A1 | 7/2014 | Kim | |
| 2014/0268869 A1 | 9/2014 | Blessitt et al. | |
| 2015/0138829 A1 | 5/2015 | Jang | |

FOREIGN PATENT DOCUMENTS

| | | |
|---|---|---|
| WO | WO 2012030387 | 3/2012 |
| WO | WO 2014/055325 | 4/2014 |

OTHER PUBLICATIONS

Cooper Lighting, Skyridge 1×4, 1×2 PAR Graphic Documentation; Nov. 14, 2013.
International Search Report for PCT/US2015/033367, mailed Jul. 31, 2015.

* cited by examiner

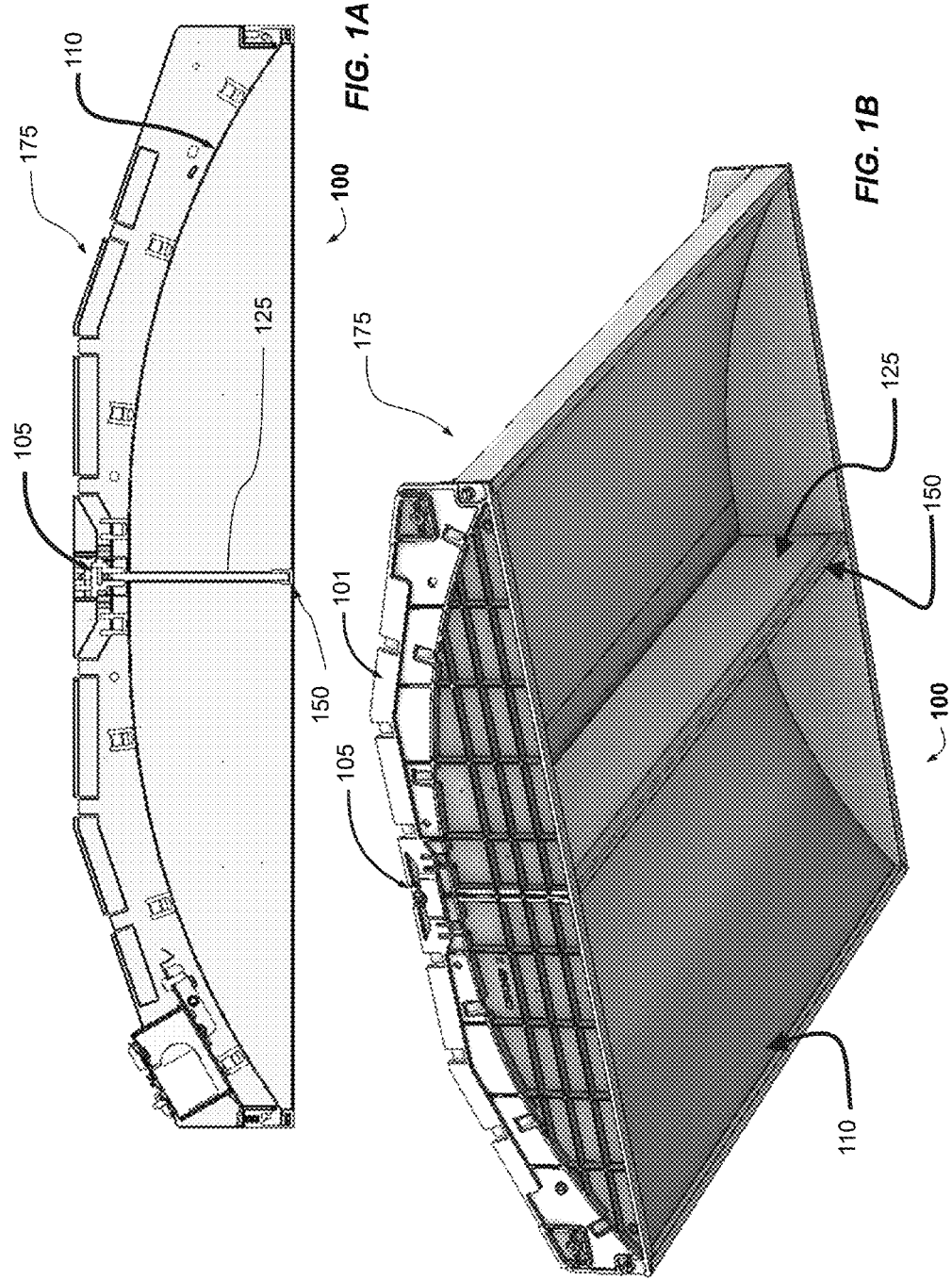

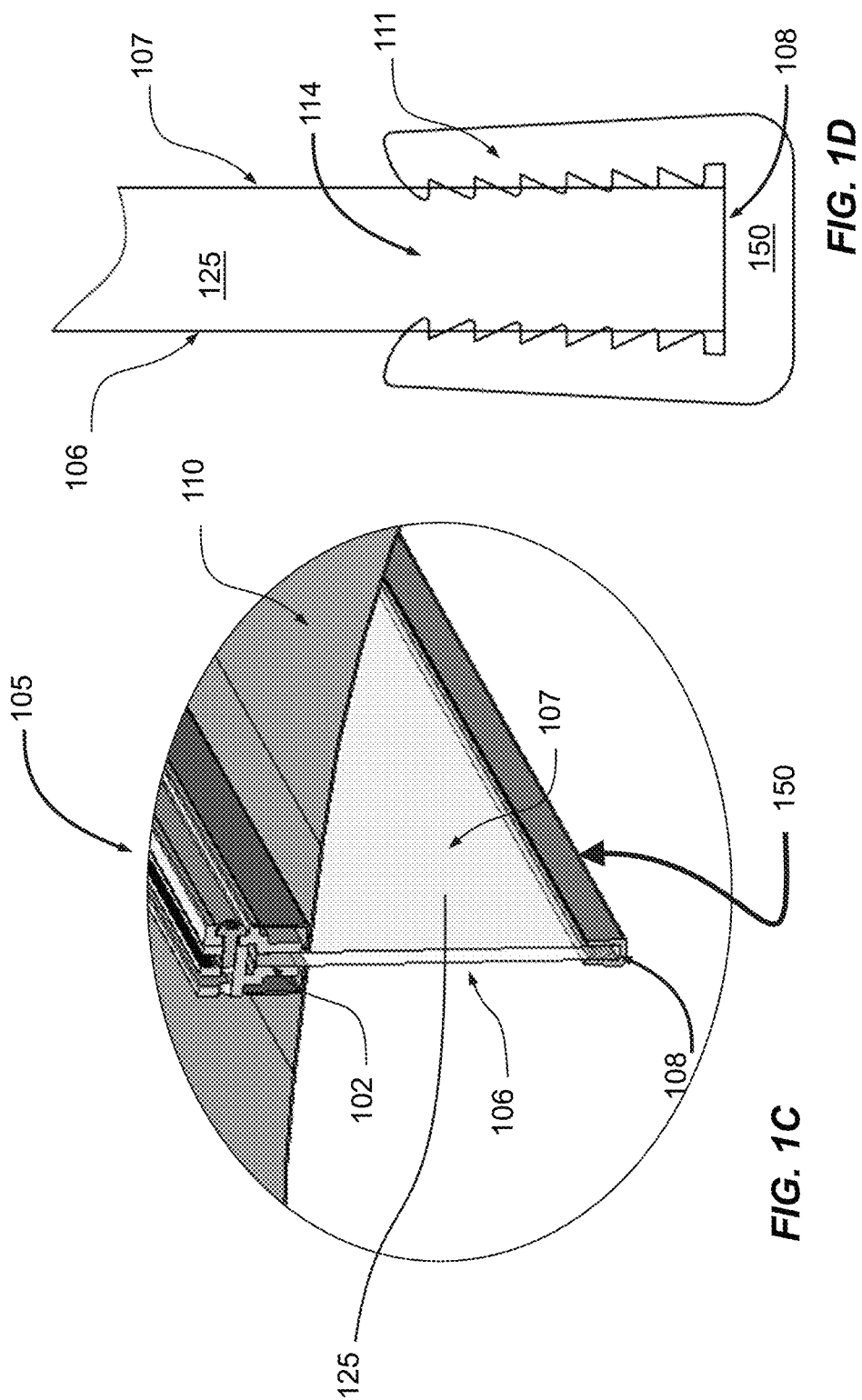

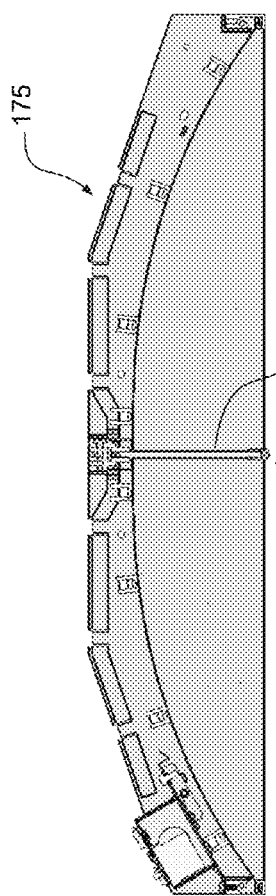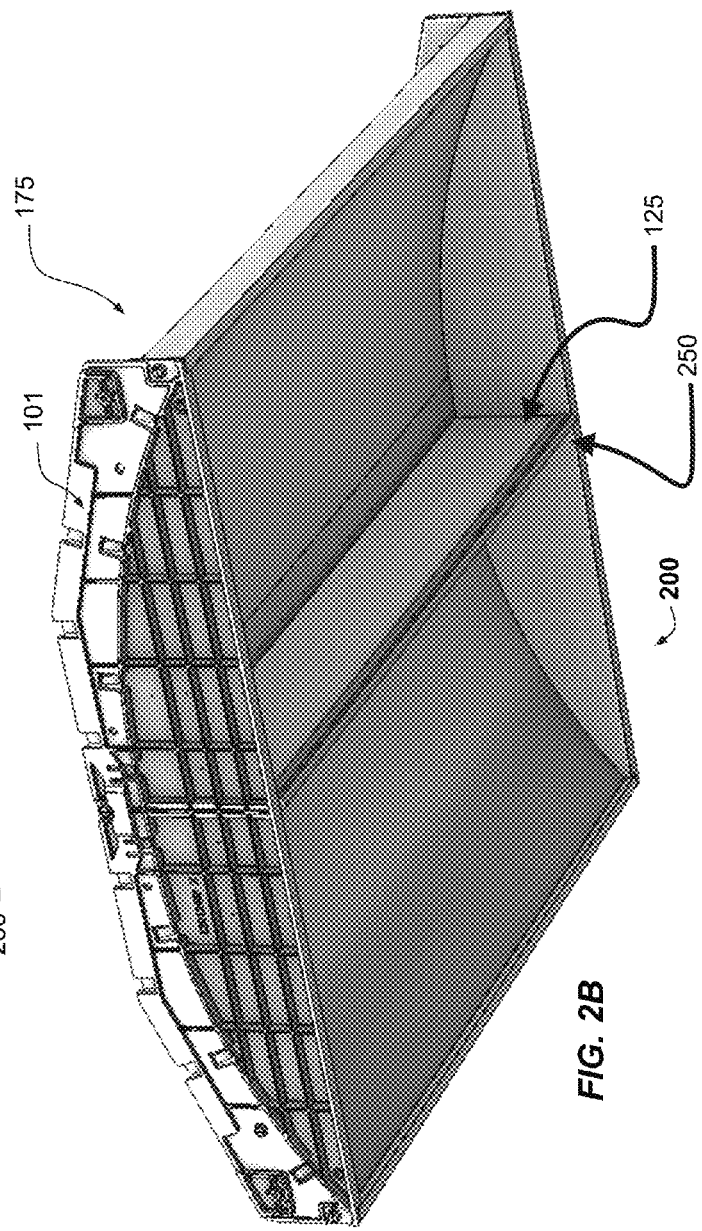

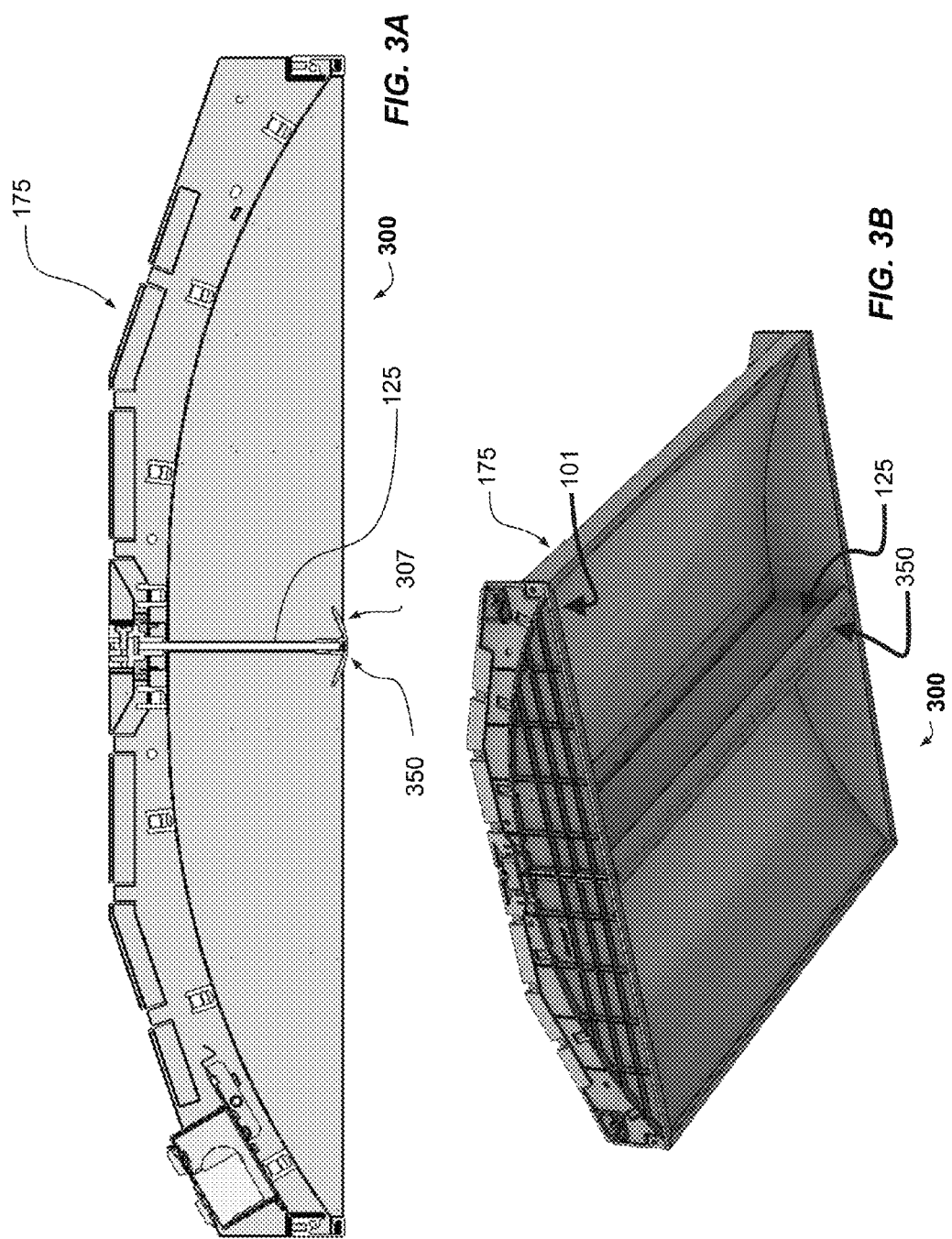

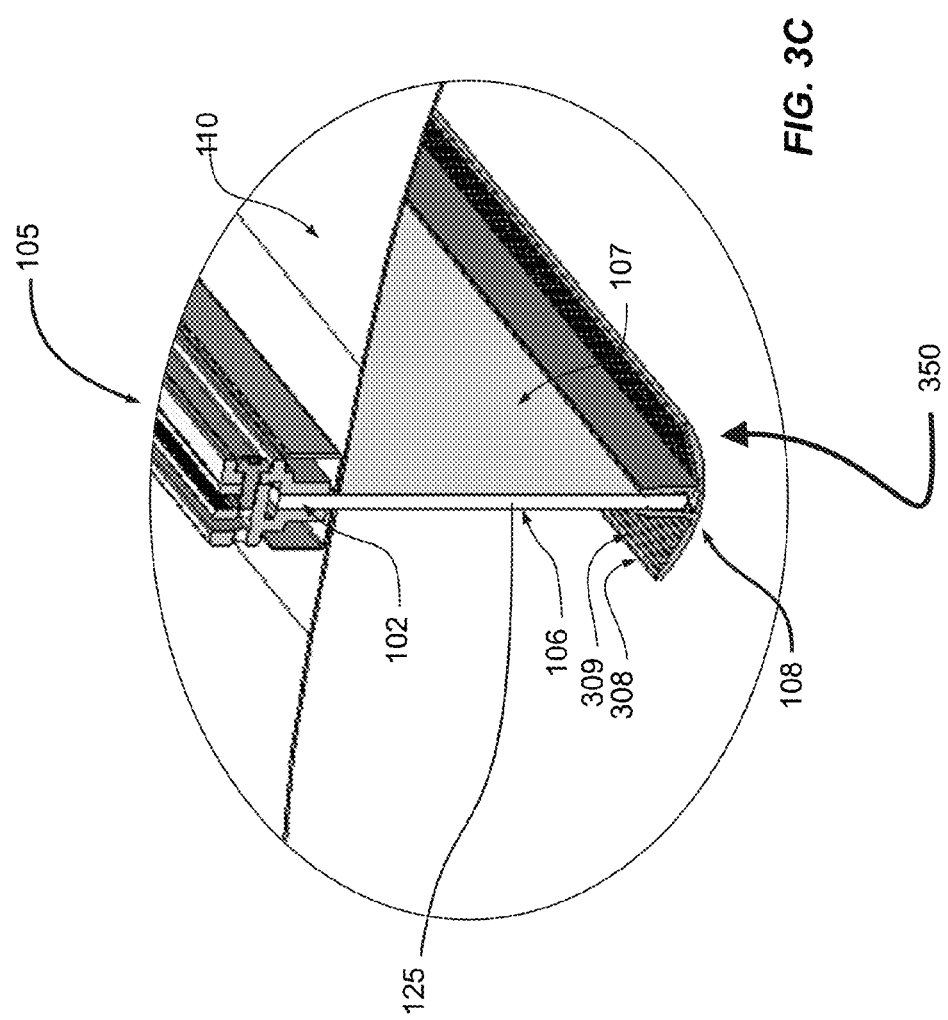

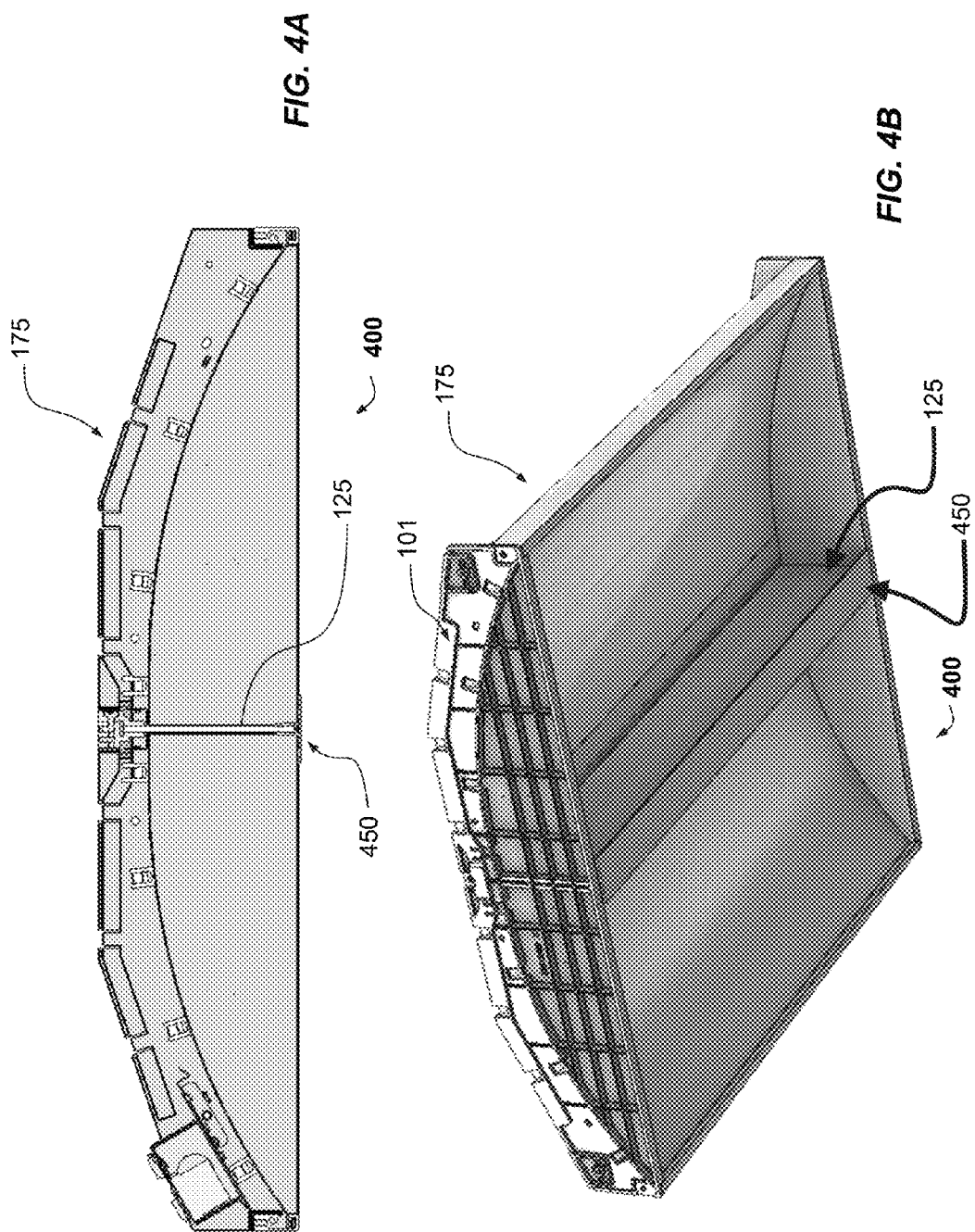

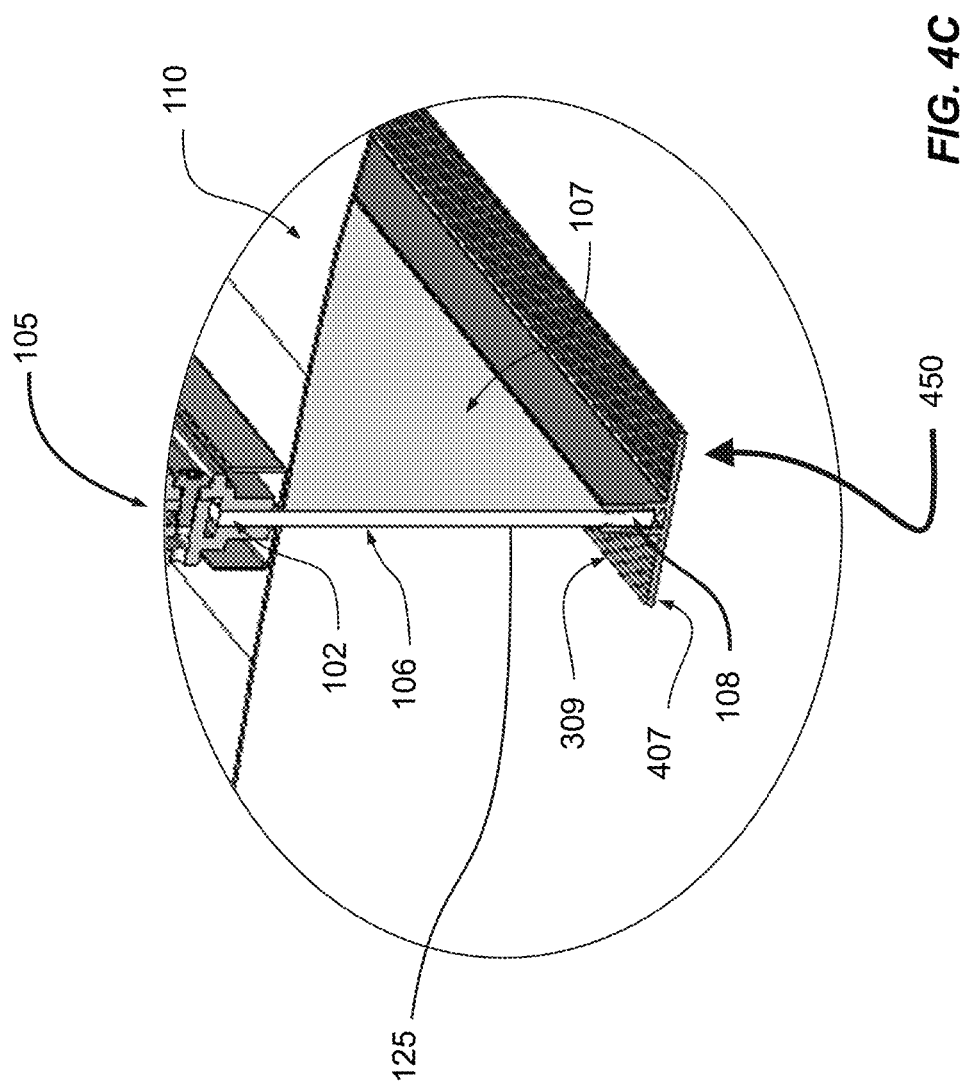

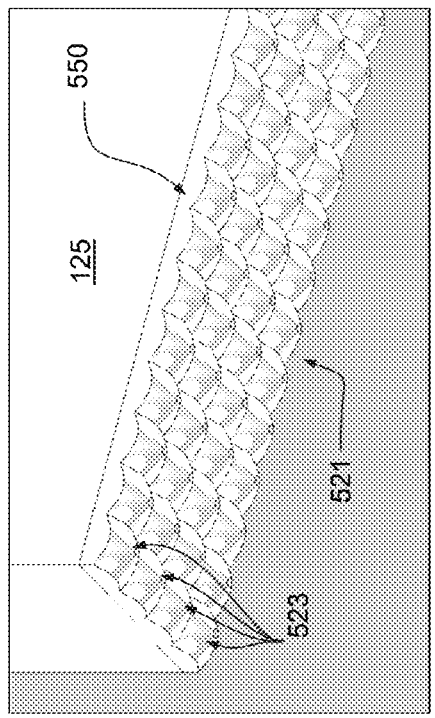
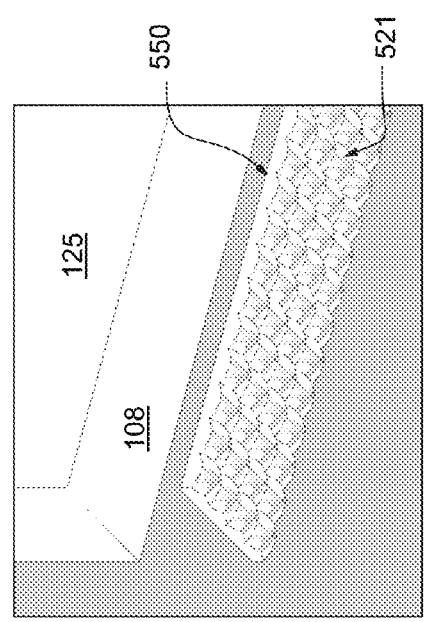
FIG. 5A
FIG. 5B
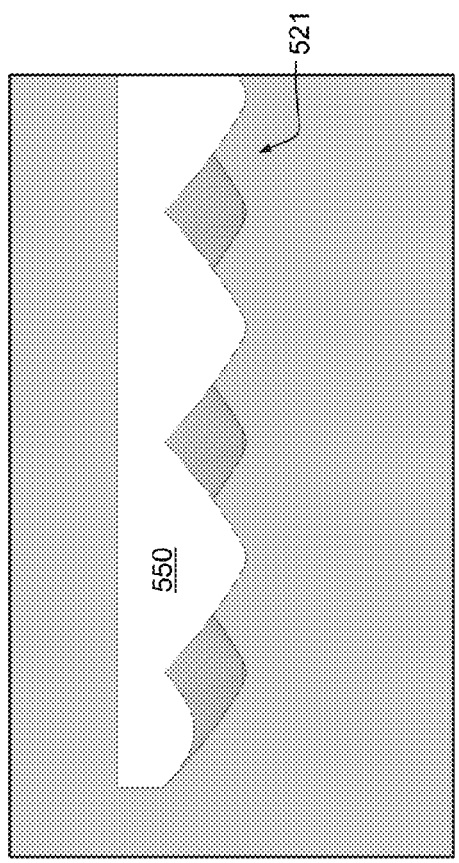
FIG. 5C

MANAGED ILLUMINATION LIGHTGUIDE

CROSS REFERENCE TO RELATED APPLICATIONS

This application claims priority to U.S. Provisional Patent Application No. 62/005,339 filed May 30, 2014 in the name of José Antonio Laso, Adam Foy, and Scott David Wegner and entitled "Managed Illumination Lightguide," the entire contents of which are hereby incorporated herein by reference.

TECHNICAL FIELD

Embodiments of the technology relate generally to a lighting apparatus that includes a lightguide, and more particularly a panel-shaped lightguide having an edge and an optic that is attached to or formed in the edge.

BACKGROUND

Light emitting diodes (LEDs) offer substantial potential benefit for illumination applications associated with energy efficiency, light quality, and compact size. However, to realize the full potential of the benefits offered by light emitting diodes, new technologies are needed. For example, when one or more light emitting diodes are coupled to a lightguide in connection with distributing or managing light for illumination, the light can emerge from the lightguide unevenly or with hotspots.

Accordingly, there are needs in the art for technology to manage light produced by one or more light emitting diodes. Need exists for a technology to avoid hot spots or uneven distribution when light is coupled into and carried by a lightguide in connection with illumination. Need further exists for a technology to improve the distribution of illumination from a lightguide. A capability addressing one or more such needs, or some other related deficiency in the art, would support improved illumination systems and more widespread utilization of light emitting diodes and/or lightguides in lighting applications.

SUMMARY

A light source can be positioned adjacent an edge of a lightguide, so that the light source couples light into the lightguide via the edge. The lightguide can have a shape of a panel, a slab, a plate, or other structure comprising two major faces. The light can propagate in the lightguide via internal reflection from the two major faces, traveling from the light-source edge towards an opposing edge. Illumination light can escape from the lightguide through the major faces and the opposing edge. An optic can be mounted or integrated to the opposing edge to soften, diffuse, spread, concentrate, scatter, or otherwise manage light emitted from that edge.

The foregoing discussion is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE DRAWINGS

FIGS. 1A, 1B, 1C, and 1D (collectively FIG. 1) illustrate an example luminaire comprising an example frame that supports an example lightguide and an associated example optic according to some embodiments of the disclosure.

FIGS. 2A, 2B, 2C, and 2D (collectively FIG. 2) illustrate an example luminaire that comprises an example frame that supports an example lightguide and another example optic according to some embodiments of the disclosure.

FIGS. 3A, 3B, and 3C (collectively FIG. 3) illustrate an example luminaire that comprises an example frame that supports an example lightguide and another example optic according to some embodiments of the disclosure.

FIGS. 4A, 4B, and 4C (collectively FIG. 4) illustrate an example luminaire that comprises an example frame that supports an example lightguide and another example optic according to some embodiments of the disclosure.

FIGS. 5A, 5B, and 5C (collectively FIG. 5) illustrate an example optic that is attached to a light emitting edge of a lightguide according to some embodiments of the disclosure.

Figure 2D:
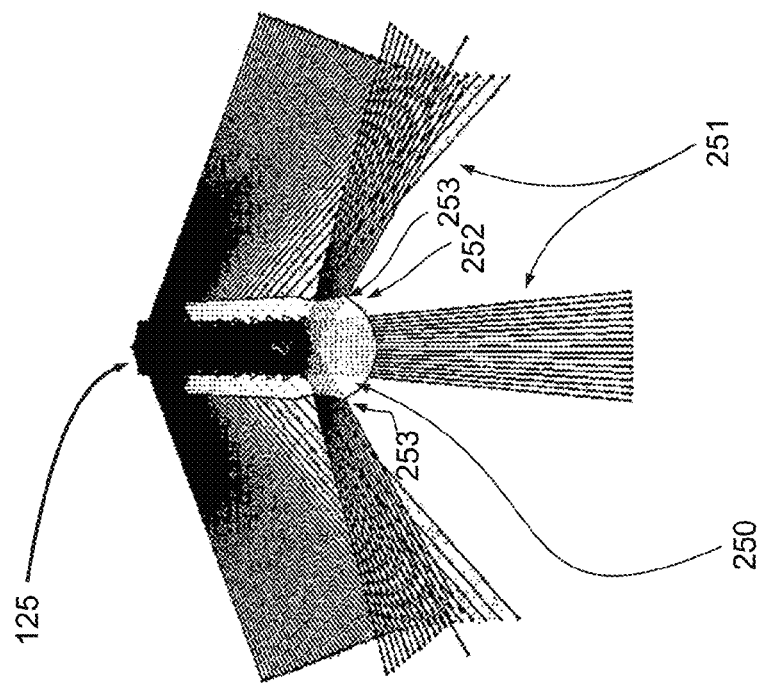

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

A lightguide can have a panel, slab, plate, or related form that comprises two major faces that are internally reflective. Light can be introduced into the lightguide from a first edge of the lightguide, so that the major faces guide the light towards a second edge. The major faces can provide a controlled release of a portion of the guided light to illuminate an area. Another portion of the light can travel through the lightguide all the way from the first edge to the second edge. An optic disposed at the second edge can control the light that is incident upon the second edge. The optic can be attached to the edge or integrated into the edge and may diffuse or otherwise manage the light.

Some representative embodiments will be described more fully hereinafter with example reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

As further discussed below, FIGS. 1, 2, 3, and 4 illustrate four representative embodiments of a luminaire incorporating an edgelit panel or lightguide with associated optics for managing light emitting from an edge of the lightguide. FIGS. 5, 6, 7, 8, 9, and 10 illustrate some additional example embodiments of optics for managing light emitting from a lightguide edge.

FIGS. 1, 2, 3, and 4 will now be briefly described individually, and then discussed in further detail.

FIGS. 1A, 1B, 1C, and 1D illustrate an example luminaire 100 that comprises a frame 175 that supports an example lightguide 125 with an example optic 150 according to some embodiments. FIG. 1A illustrates a side view of the luminaire 100 with the end cover 101 of the luminaire 100 removed. FIG. 1B illustrates a perspective view of the lower, light-emitting side of the luminaire 100. FIG. 1C illustrates a detail perspective view in which the end cover 101 of the luminaire 100 is removed to show the lightguide 125 and the optic 150. FIG. 1D illustrates a cross sectional view showing the optic 150 and a portion of the lightguide 125 to which the optic 150 is attached.

Figure 2C:
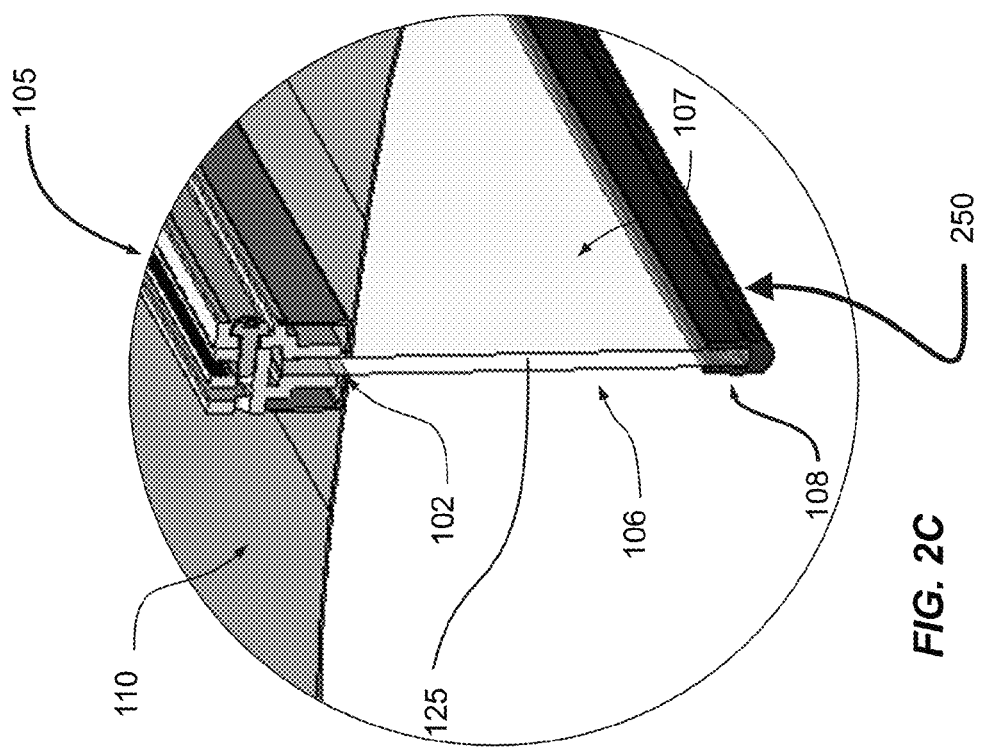

FIGS. 2A, 2B, 2C, and 2D illustrate another example luminaire 200 that comprises the frame 175 that supports the example lightguide 125 with another example optic 250 according to some embodiments. In an example embodiment, the luminaire 200 of FIG. 2 can be viewed as a variation of the luminaire 100 illustrated in FIG. 1 with the optic 250 replacing the optic 150. FIG. 2A illustrates a side view of the luminaire 200 with the end cover 101 removed. FIG. 2B illustrates a perspective view of the luminaire 200. FIG. 2C illustrates a detail perspective view in which the end cover 101 is removed to show the lightguide 125 and the optic 250. FIG. 2D illustrates, in cross section, a computer-generated ray tracing that provides a representative light distribution 251 for the lightguide 125 and the optic 250.

FIGS. 3A, 3B, and 3C illustrate another example luminaire 300 that comprises the frame 175 that supports the example lightguide 125 with another example optic 350 according to some embodiments. In an example embodiment, the luminaire 300 of FIG. 3 can be viewed as a variation of the luminaire 100 illustrated in FIG. 1 with the optic 350 replacing the optic 150. FIG. 3A illustrates a side view of the luminaire 300 with the end cover 101 removed. FIG. 3B illustrates a perspective view of the luminaire 300, taken from below the luminaire 300. FIG. 3C illustrates a detail perspective view with the end cover 101 removed to show the lightguide 125 and the optic 350.

FIGS. 4A, 4B, and 4C illustrate an example luminaire 400 that comprises the frame 175 that supports the example lightguide 125 with another example optic 450 according to some embodiments. In an example embodiment, the luminaire 400 of FIG. 3 can be viewed as a variation of the luminaire 100 illustrated in FIG. 1 with the optic 450 replacing the optic 150. FIG. 4A illustrates a side view of the luminaire 400 with the end cover 101 removed. FIG. 4B illustrates a perspective view of the luminaire 400. FIG. 4C illustrates a detail perspective view with the end cover 101 removed to show the lightguide 125 and the optic 450.

Accordingly, FIGS. 1, 2, 3, and 4 illustrate four representative luminaires 100, 200, 300, and 400 that respectively comprise four example embodiments of an optic 150, 250, 350, 450 applied to a common lightguide 125 mounted in a common luminaire frame 175.

In each of the luminaires 100, 200, 300, and 400 respectively illustrated in FIGS. 1, 2, 3, and 4, the luminaire frame 175 supports the lightguide 125 so that the lightguide 125 is positioned in a vertical orientation. (Other embodiments may have other orientations.) An array of light emitting diodes (LEDs) 105 is mounted adjacent an edge 102 of the lightguide 125. The light emitting diodes 105 couple light into the lightguide 125 via the edge 102. The major faces 106, 107 of the lightguide 125 guide the coupled light generally towards an opposing edge of the lightguide 125 to which the optic 150, 250, 350, or 450 is attached.

The major faces 106, 107 of the lightguide 125 can be patterned with microlenses that promote controlled release of light internally incident on those faces 106, 107. The microlenses can comprise conical features, truncated cones, convex shapes, or other appropriate features, for example. In some embodiments, the major faces 106, 107 of the lightguide 125 are unpatterned so that, relative to a microlensed embodiment, less light escapes through the faces 106, 107, and thus more light reaches the lower edge 108 and is processed by the optic 150, 250, 350, 450.

Still referring to FIGS. 1, 2, 3, and 4, each luminaire 100, 200, 300, 400 comprises a curved reflector 110 that directs towards an area to be illuminated the light that is emitted from the major faces 106, 107 of the lightguide 125. In some example embodiments, the curved reflector 110 may comprise a diffusely reflective surface or alternatively a specularly reflective surface.

In the illustrated embodiments of FIGS. 1, 2, 3, and 4, each optic 150, 250, 350, 450 comprises an elongated piece of optical material comprising a channel or groove 114. The edge 108 of the lightguide 125 is disposed or seated in the groove 114 of the optic 110, 250, 350, 450, so that the optic 110, 250, 350, 450 captures the lightguide 125 (as will be discussed in further detail below with example reference to FIG. 1D that illustrates details of a representative embodiment). The optic 110, 250, 350, 450 spreads and/or diffuses the incident light, thereby suppressing or blending any hotspots and enhancing light distribution. In some embodiments, the optic 110, 250, 350, 450 comprises a diffuser.

In some example embodiments, the optic 150, 250, 350, 450 comprises embedded particles or materials that scatter light propagating through the optic 150, 250, 350, 450. In some example embodiments, the optic 150, 250, 350, 450 comprises a patterned surface that diffuses light as the light transmits through that surface. In some example embodiments, the optic 150, 250, 350, 450 comprises a refractive surface that spreads, concentrates, focuses, diverges, or otherwise manipulates light.

In some example embodiments, the optic 150, 250, 350, 450 comprises a plastic optical material such as PMMA acrylic, polystyrene, or optical grade polycarbonate, to mention a few representative examples without limitation. In some example embodiments, the optic 150, 250, 350, 450 comprises silicone or another appropriate elastomer. In some example embodiments, such optical materials may be clear. In some example embodiments, such optical materials may comprise scattering additives, fine particles, or a diffusion agent. In some example embodiments, the optic 150, 250, 350, 450 comprises a mixture or blend of multiple polymers, such as 85% acrylic and 15% high impact acrylic, for example. In some example embodiments, such optical materials may comprise colorants or dyes that filter light, for example to produce red, orange, yellow, green, blue, violet, or some other appropriate color.

In some example embodiments, friction can retain the optic 150, 250, 350, 450 on the lightguide 125. See, for example, the detail view provided by FIG. 1D. In some embodiments, clamping or squeezing force can retain the optic 150, 250, 350, 450 on the lightguide 125, for example via a friction fit. In some example embodiments, a snap-on fit can retain the optic 150, 250, 350, 450 on the lightguide 125. In some example embodiments, the optic 150, 250, 350, 450 comprises small grooves 111 that extend lengthwise and function or act as grippers for enhanced retention, for example as illustrated in FIG. 1D. In some example embodiments, the optic 150, 250, 350, 450 can be held on the lightguide 125 via adhesive, glue heat-induced fusion, welding, or other appropriate bonding or fastening technology.

Referring now to the example embodiment of FIG. 1, the optic 150 comprises a substantially U-shaped cross section that can widen the light distribution relative to a distribution provided by the lightguide 125 alone. In some embodiments, the optic 150 comprises a scattering agent that is homogenously distributed throughout the optic 150. In some embodiments, the optic 150 can be made by co-extrusion of two optical materials, one having more scattering agent than the other. For example, the optic 150 can comprise a main body of clear optical material and one or more strips of diffusing material extending lengthwise, for example along the lowermost portion of the optic 150 and/or along the outer sides of the optic 150. In some embodiments, co-extrusion provides one or more stripes of colored material.

In some embodiments, a lower layer of diffuser material is added by means other than co-extrusion. In some embodiments, an upper layer of diffuser material is added by means other than co-extrusion. For example, one or more diffusion layers can be bonded to a main body utilizing heat, welding, adhesive, or other appropriate bonding or fusion means.

Referring now to the example embodiment of FIG. 2, the lowermost portion of the optic 250 comprises a convex refractive surface 252 extending lengthwise along the lightguide 125. Additionally, the sides of the optic 250 have concave recesses 253 that extend lengthwise. As shown in the example ray traces of FIG. 2D, the concave recesses 253 and the convex refractive surface 252 can provide a split illumination pattern 251. In the split illumination patterns 251, one portion of light is concentrated downward by the convex refractive surface 252 and two other portions are spread outward by the concave recesses 253. When fabricated from clear optical material, an example embodiment of the optic 250 can provide an overall distribution that is narrow relative to the embodiment of FIG. 1.

Referring now to the example embodiment of FIG. 3, the optic 350 comprises a bow-shaped bottom 307 that extends lengthwise along the lightguide 125. The upper surface 308 of the optic 350 is patterned with refractive surface features 309 to promote diffusion. The optic 350 can be made from an optical material loaded with a diffusing agent to further promote diffusion, resulting in a wide distribution of light.

Referring now to the example embodiment of FIG. 4, the optic 450 comprises a cross section that is T-shaped. The lower surface 407 of the optic 450 is flat, so that a flat section is substantially perpendicular to the lightguide 125 and extends lengthwise. Opposite the lower surface 407, the upper side of the optic 450 is patterned with refractive surface features 309. The optic 450 can be made from an optical material loaded with a diffusing agent to further promote diffusion, resulting in a wide distribution of light.

Turning now to FIGS. 5, 6, 7, 8, 9, and 10, some more example embodiments will now be discussed with reference to these figures.

FIGS. 5A, 5B, and 5C illustrate an example optic 550 that is attached to the light emitting edge of the lightguide 125 according to some embodiments. FIG. 5A illustrates an exploded perspective view. FIG. 5B illustrates an assembled perspective view. FIG. 5C illustrates a diagonal cross sectional view of the optic 550.

The optic 550 can be bonded, fused, glued, mechanically fastened, or otherwise disposed at the light emitting edge 108 of the lightguide 125. In some embodiments, there is an air gap between the edge 108 of the lightguide 125 and the optic 550. In some embodiments, there is no such air gap. The resulting system can be incorporated in the luminaire 100 that is illustrated in FIG. 1 and discussed above, for example. The lower surface of the optic 550 comprises a prismatic pattern 521 that creates a relatively narrow distribution of light and that reduces glare at high viewing angles. In the illustrated embodiment, the prismatic pattern 521 has four features 523 across the narrow dimension of the lightguide 125. Other embodiments may have more or fewer features 523, for example. Thus, the features 523 may be smaller or larger than illustrated relative to the lightguide 125.

Figure 6A:
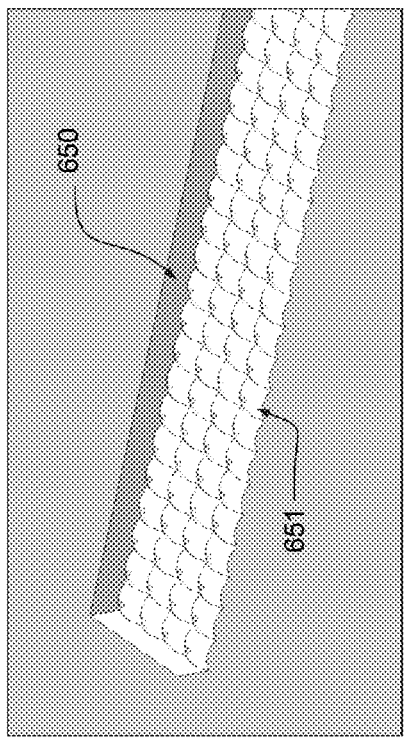
FIGS. 6A, 6B, and 6C (collectively FIG. 6) illustrate another example optic that can be attached to a light emitting edge of a lightguide according to some embodiments of the disclosure.
Figure 6B:
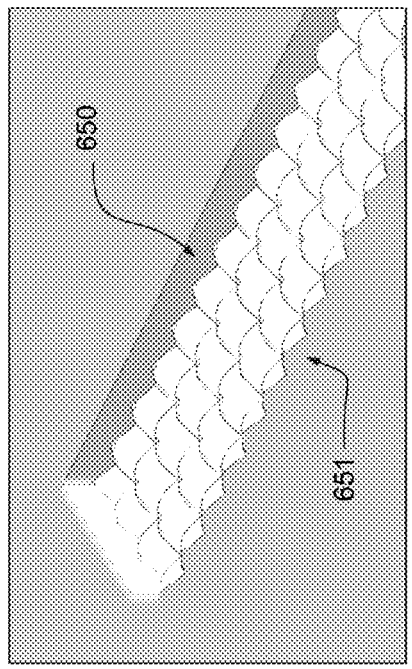
Figure 6C:
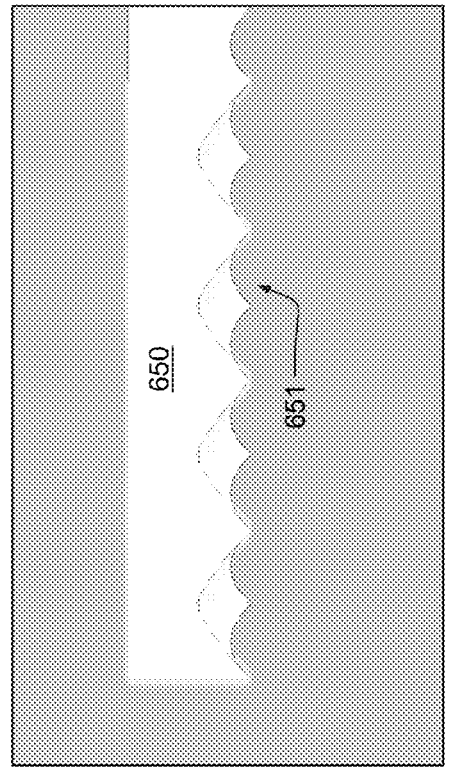

FIGS. 6A, 6B, and 6C illustrate an example optic 650 that can be attached to the light emitting edge 108 of the lightguide 125 (not illustrated in FIG. 6) according to some embodiments. FIG. 6A illustrates a first perspective view. FIG. 6B illustrates a second perspective view. FIG. 6C illustrates a cross sectional view.

The optic 650 can be bonded, fused, glued, mechanically fastened, or otherwise disposed at the light emitting edge 108 of the lightguide 125. The resulting optical system can be incorporated in the luminaire 100 that is illustrated in FIG. 1 as discussed above, for example. The lower portion of the optic 650 comprises a patterned surface 651 that creates a relatively narrow distribution of light and may be utilized to reduce glare at high viewing angles. In the illustrated embodiment, the pattern 650 can be viewed as having a female form. In some embodiments, features of FIGS. 5 and 6 can have positive and negative geometry relative to one another. In other words, the patterned surface 651 of the optic 650 that FIG. 6 illustrates can physically fit into the patterned surface 521 of the optic 550 that FIG. 5 illustrates.

Figure 7A:
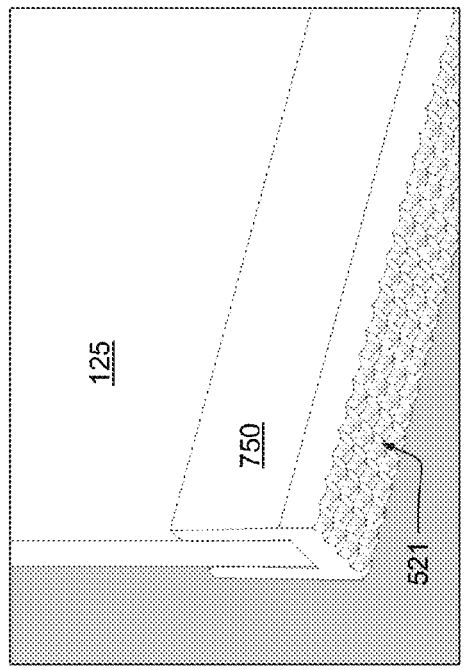
FIGS. 7A, 7B, and 7C (collectively FIG. 7) illustrate another example optic attached to a light emitting edge of a lightguide according to some embodiments of the disclosure.
Figure 7B:
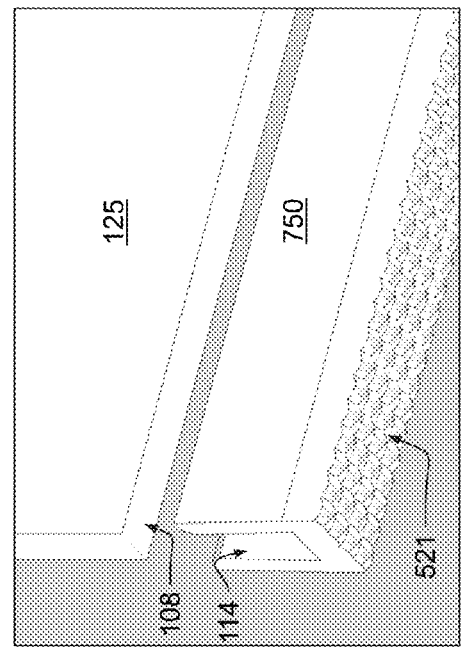
Figure 7C:
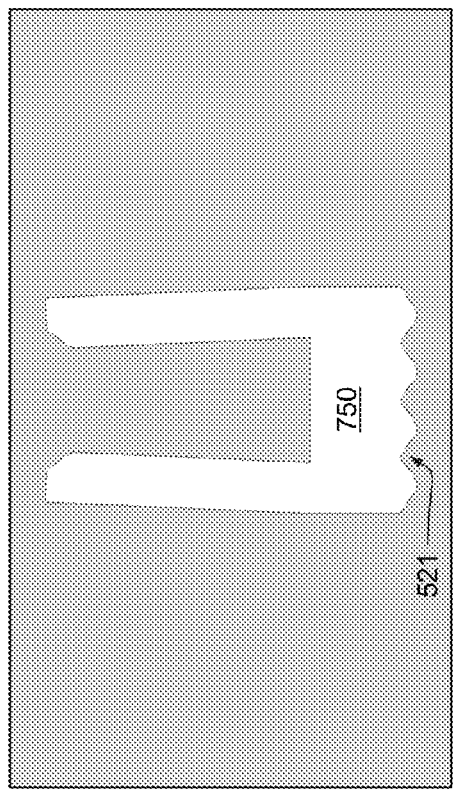

FIGS. 7A, 7B, and 7C illustrate an example optic 750 that is attached to the light emitting edge of the lightguide 125 according to some embodiments. FIG. 7A illustrates an exploded perspective view. FIG. 7B illustrates an assembled perspective view. FIG. 7C illustrates a cross sectional view of the optic 750.

In the illustrated embodiment, the optic 750 can mechanically fasten onto the light emitting edge 108 of the lightguide 125. For example, the groove 114 of the optic 750 can snap onto the lightguide edge 108 as discussed above with reference to FIG. 1D. The resulting optical system can be incorporated in the luminaire 100 that is illustrated in FIG. 1 and discussed above, for example.

As illustrated by FIG. 7, the patterned optical surface 521 has a common geometry to that of FIG. 5. In various other embodiments, the patterned optical surface 521 may have the geometry of FIG. 6 or some other appropriate form, for example.

Figure 8A:
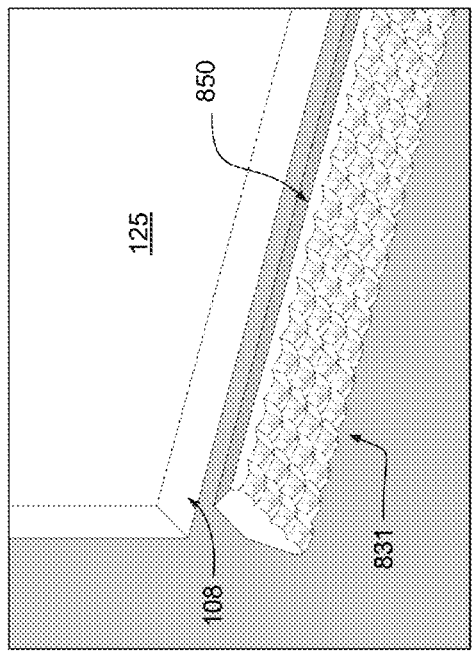
FIGS. 8A, 8B, and 8C (collectively FIG. 8) illustrate another example optic that is attached to a light emitting edge of a lightguide according to some embodiments of the disclosure.
Figure 8B:
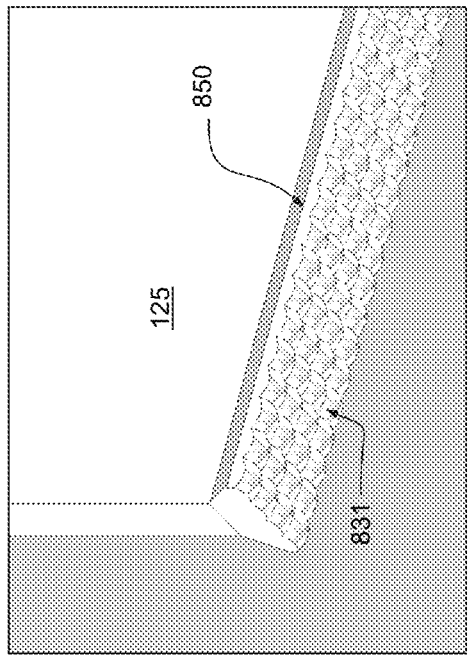
Figure 8C:
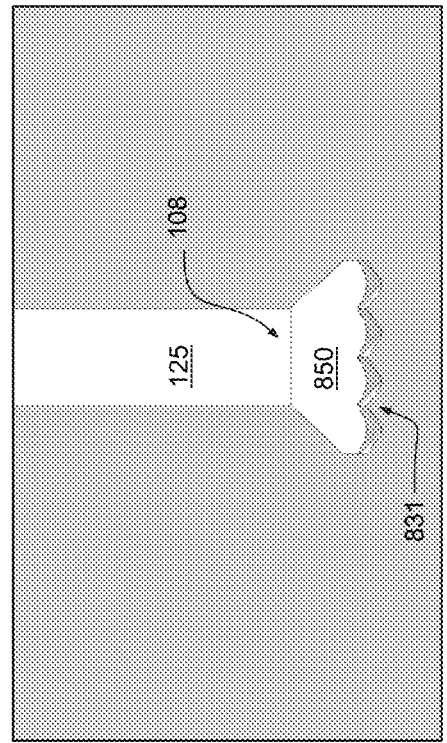

FIGS. 8A, 8B, and 8C illustrate an example optic 850 that is attached to the light emitting edge 108 of the lightguide 125 according to some embodiments. FIG. 8A illustrates an exploded perspective view. FIG. 8B illustrates an assembled perspective view. FIG. 8C illustrates a cross sectional view.

In the illustrated embodiment of FIG. 8, the optic 850 is tapered or flared. In this form, the lens array pattern 831 can be offset from the lightguide 125 to spread light over a greater area (compared to the area of the lightguide edge), further reducing glare at high viewing angles. The optic 850 and the lightguide 125 form an optical system that can be incorporated in the luminaire 100 that is illustrated in FIG. 1 and discussed above, for example.

Figure 9A:
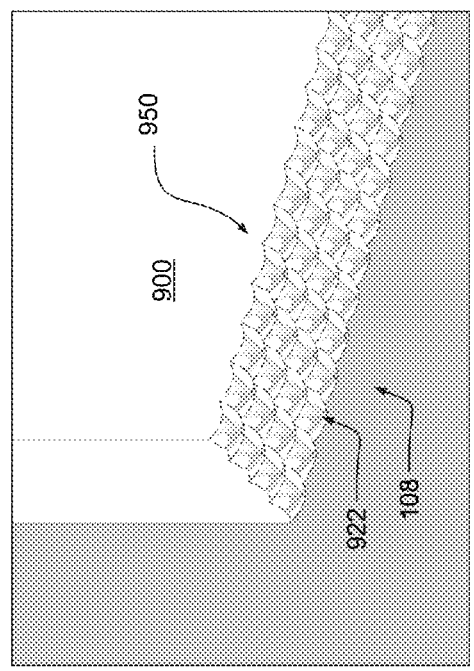
FIGS. 9A and 9B (collectively FIG. 9) illustrate another example optic that is formed into a light emitting edge of a lightguide according to some embodiments of the disclosure.
Figure 9B:
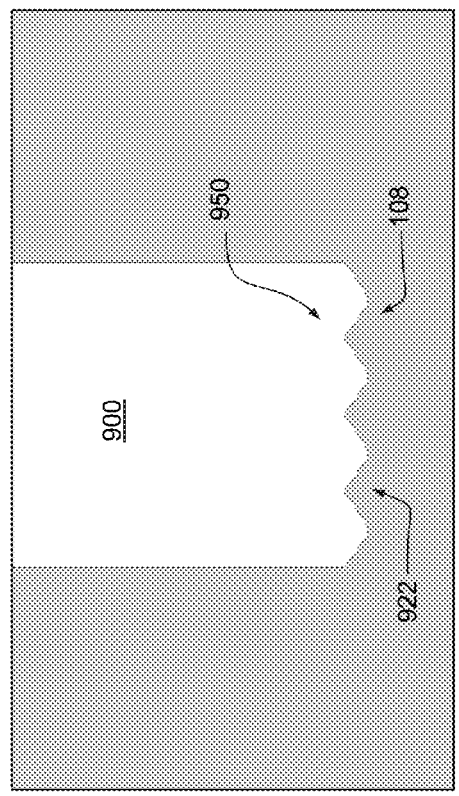

FIGS. 9A and 9B illustrate another example optic 950 that is formed into the light emitting edge 108 of the lightguide 900 according to some embodiments. Thus, the lens array pattern 922 can be integrated directly into a lightguide edge 108 to provide a single continuous part that may be seamless or formed from a unitary piece of material, for example.

The lightguide 900 with its integral optic 950 can be fabricated by injection molding in some example embodiments. In some example embodiments, the lightguide 900 with its integral optic 950 can be formed by cutting or ablating the lens array pattern 922 into a flat lightguide edge. In some example embodiments, the lightguide 900 with its integral optic 950 can be formed by fusing or thermally bonding a patterned optical element to a flat lightguide edge.

Figure 10:
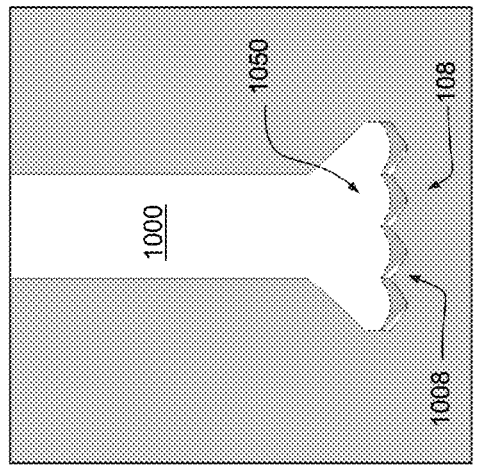
FIG. 10 illustrates another example optic formed into a light emitting edge of a lightguide, where the light emitting edge is flared outward and the optic comprises features formed in the lightguide edge according to some embodiments of the disclosure.

FIG. 10 illustrates an embodiment in which the lightguide 1000 comprises a light emitting edge 108 that is flared outward. Refractive optical features 1008 are formed in the lower edge 108 of the lightguide 1000. The resulting optic 1050 comprises a pattern of refractive optical features 1008 formed in the flared lightguide edge 108.

The lightguide 1000 with its integral optic 1050 can be fabricated by injection molding in some example embodiments. In some example embodiments, the lightguide 1000 with its integral optic 1050 can be formed by cutting or ablating a lightguide having the form of the lightguide 125 illustrated in FIG. 1. In some example embodiments, the lightguide 1000 with its integral optic 1050 can be formed by fusing or thermally bonding a patterned, tapered optical element to a flat lightguide edge.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A lighting system comprising:
   a light emitting diode; and
   a lightguide comprising:
      a first face;
      a second face;
      a first edge that extends between the first face and the second face and that is disposed adjacent the light emitting diode to receive light emitted by the light emitting diode; and
      a second edge that extends between the first face and the second face and that is opposite the first edge to emit from the lightguide a portion of the received light; and
   an optical element that extends along the second edge and comprises a channel in which the second edge is disposed, the channel comprising:
      a bottom portion that faces the second edge;
      a first side portion that faces the first face of the lightguide and that comprises first lengthwise extending grooves for gripping the first face of the lightguide; and
      a second side portion that faces the second face of the lightguide and that comprises second lengthwise extending grooves for gripping the second face of the lightguide.

2. The lighting system of claim 1, wherein the optical element comprises a scattering agent.

3. The lighting system of claim 1, wherein the optical element comprises a colored stripe.

4. The lighting system of claim 1, wherein the optical element comprises a plurality of coextruded layers, at least one of the layers comprising clear plastic material.

5. A luminaire comprising:
   a frame;
   a lightguide that is attached to the frame and that comprises:
      a first internally reflective face formed on a body of optical material;
      a second internally reflective face formed on the body of optical material, opposite the first internally reflective face;
      a first edge extending on the body of optical material between the first internally reflective face and the second internally reflective face; and
      a second edge, opposite the first edge, extending on the body of optical material between the first internally reflective face and the second internally reflective face;
   a plurality of light emitting diodes disposed adjacent the first edge to couple light into the lightguide; and
   an optic that is attached to the second edge, that extends along the second edge, and that comprises a main body of clear optical material and one or more stripes of diffusing material extending lengthwise,
   wherein the optic comprises a channel in which the second edge is disposed,
   wherein the channel comprises an interior surface adjoining the lightguide, and
   wherein the interior surface comprises grooves.

6. The luminaire of claim 5, wherein the lightguide comprises an edgelit panel and the optical material comprises substantially clear plastic, and wherein the one or more stripes of diffusing material comprises a stripe that extends along a lowermost portion of the optic.

7. The luminaire of claim 5, wherein the one or more stripes of diffusing material comprises a stripe that extends along an outer side the optic.

8. The luminaire of claim 5, wherein the optic comprises a cross section that is T-shaped.

9. The luminaire of claim 5, wherein the optic comprises a cross section that has a concave light emitting surface.

10. The luminaire of claim 5, wherein the optic comprises a cross section that has a convex light emitting surface.

11. The luminaire of claim 5, wherein the optic comprises a cross section that has a flat light emitting surface.

12. A lighting system comprising:
   a light source that is operative to emit light;
   a panel of optical material that forms a lightguide and that comprises:
      a first face;
      a second face opposite the first face;
      a first edge that extends between the first face and the second face and that is disposed adjacent the light source to receive the emitted light; and
      a second edge that extends between the first face and the second face and that is disposed to emit a portion of the received light; and
   an optic extending along the second edge and comprising a groove that snaps onto the second edge.

13. The lighting system of claim 12, wherein the optic comprises colored material for filtering light.

14. The lighting system of claim 12, wherein the optic comprises male optical features.

15. The lighting system of claim 12, wherein the optic comprises female optical features.

16. The lighting system of claim 12, wherein the optic comprises a scattering agent.

17. The lighting system of claim 12, wherein the optic comprises a plurality of coextruded layers, at least one of the layers comprising clear plastic material.

18. A lighting system comprising:
   a light source that is operative to emit light;
   a panel of optical material that forms a lightguide and that comprises:
      a first face;
      a second face opposite the first face;
      a first edge that extends between the first face and the second face and that is disposed adjacent the light source to receive the emitted light; and
      a second edge that extends between the first face and the second face and that is disposed to emit a portion of the received light; and
   an optic extending along the second edge,
   wherein the light source comprises a light emitting diode,
   wherein the optic comprises a channel in which the second edge is disposed,
   wherein the channel comprises an interior surface adjoining the lightguide,
   wherein the interior surface comprises grooves, and
   wherein the optic embraces the second edge.

19. The lighting system of claim 1, wherein the optical element is patterned with refractive features.

* * * * *